(12) United States Patent
Wang et al.

(10) Patent No.: US 12,007,233 B2
(45) Date of Patent: Jun. 11, 2024

(54) MAGNETIC SENSING FOR A SCANNING MIRROR IN LiDAR SYSTEM

(71) Applicant: BEIJING VOYAGER TECHNOLOGY CO., LTD., Beijing (CN)

(72) Inventors: Youmin Wang, Berkeley, CA (US); Yufeng Wang, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 640 days.

(21) Appl. No.: 17/192,697

(22) Filed: Mar. 4, 2021

(65) Prior Publication Data
US 2022/0282965 A1    Sep. 8, 2022

(51) Int. Cl.
| G02B 26/08 | (2006.01) |
| G01B 7/30  | (2006.01) |
| G01S 7/481 | (2006.01) |
| G01S 17/08 | (2006.01) |
| G02B 26/10 | (2006.01) |

(52) U.S. Cl.
CPC .............. G01B 7/30 (2013.01); G01S 7/4817 (2013.01); G01S 17/08 (2013.01); G02B 26/0833 (2013.01); G02B 26/105 (2013.01)

(58) Field of Classification Search
CPC ......... G01B 7/30; G01S 7/4817; G01S 17/08; G01S 17/42; G02B 26/0833; G02B 26/105; G02B 26/085; G01D 5/2013
See application file for complete search history.

(56) References Cited

U.S. PATENT DOCUMENTS

| 10,324,184 | B1 * | 6/2019  | Duan   | G01S 7/4817 |
| 2007/0257565 | A1 * | 11/2007 | Urey   | G02F 1/09 29/608 |
| 2008/0285107 | A1 * | 11/2008 | Asada  | G02B 26/085 359/224.1 |
| 2016/0231557 | A1 * | 8/2016  | Lemaire | G02B 7/008 |
| 2016/0280535 | A1 * | 9/2016  | Lee    | G01C 19/56 |

FOREIGN PATENT DOCUMENTS

KR    102123167 B1    6/2020

OTHER PUBLICATIONS

International Search Report issued in corresponding International Application No. PCT/US2021/061969, dated Apr. 13, 2022, 3 pages.
Written Opinion of the International Searching Authority issued in corresponding International Application No. PCT/US2021/061969, dated Apr. 13, 2022, 5 pages.

* cited by examiner

*Primary Examiner* — Euncha P Cherry
(74) *Attorney, Agent, or Firm* — BAYES PLLC

(57) ABSTRACT

Embodiments of the disclosure provide magnetic sensing systems and methods for a scanning mirror. An exemplary magnetic sensing system includes a permanent magnet configured to provide a magnetic field. The magnetic sensing system further includes a wire coil configured to rotate relative to the permanent magnet when the scanning mirror rotates, causing an induced voltage in the wire coil. One of the permanent magnet and the wire coil locates on and rotates with the scanning mirror and the other locates off the scanning mirror. The magnetic sensing system also includes at least one controller configured to determine a rotation angle of the scanning mirror based on the induced voltage in the wire coil.

20 Claims, 7 Drawing Sheets

MAGNETIC SENSING FOR A SCANNING MIRROR IN LiDAR SYSTEM

TECHNICAL FIELD

The present disclosure relates to systems and methods for magnetically sensing a scanning mirror in light detection and ranging (LiDAR) systems, and more particularly to, systems and methods for magnetically sensing an angular position of the scanning mirror in real-time during LiDAR scanning.

BACKGROUND

LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

Optical components used in LiDAR systems include a scanning mirror, e.g., a micro-electromechanical system (MEMS) mirror, that can be rotated by an actuator of the scanning mirror to reflect (and steer) laser beams to an environment. For example, the MEMS mirror can be used in the LiDAR transmitter to form a scanner that steers laser beams from a laser source towards a range of directions in order to scan a field of view (FOV). As a resonant device, the scanner typically scans at a faster speed in the middle of the scanning range and at a slower speed at the two ends of each scan. As a result, the center of the scan has the lowest resolution, while the opposite is desired for LiDAR systems. To compensate the variation in resolution due to the variation of scanning speed of the MEMS mirror, it is beneficial to accurately sense the actual angular position (e.g., rotation angle, or also known as scanning angle) of the MEMS mirror in real-time so that adaptively feedback control can be provided to adjust the scanning angle of the MEMS mirror.

Many sensing approaches have been developed to measure the rotation angle of the MEMS mirror in real-time, such as capacitive sensing, piezoresistive sensing, and optical sensing using a position sensitive device (PSD). But each existing sensing approach has certain limitations. For example, the PSD is expensive and difficult to integrate with the scanning mirror. A capacitive sensor has a good integration capability, but it is difficult to reduce the structure of the capacitive sensor to a compact size. The piezoresistive sensor can also be easily integrated with the scanning mirror, but a specific readout circuit (e.g., Wheatstone bridge) needs to be designed to enable the piezoresistive sensing.

Embodiments of the disclosure address the above problems by providing magnetic sensing systems and methods for real-time sensing the angular position of the scanning mirror used in LiDAR systems.

SUMMARY

Embodiments of the disclosure provide a magnetic sensing system for a scanning mirror. An exemplary magnetic sensing system includes a permanent magnet configured to provide a magnetic field. The magnetic sensing system further includes a wire coil configured to rotate relative to the permanent magnet when the scanning mirror rotates, causing an induced voltage in the wire coil. One of the permanent magnet and the wire coil locates on and rotates with the scanning mirror and the other locates off the scanning mirror. The magnetic sensing system also includes at least one controller configured to determine a rotation angle of the scanning mirror based on the induced voltage in the wire coil.

Embodiments of the disclosure also provide a magnetic sensing method for a scanning mirror. An exemplary method includes rotating a permanent magnet and a wire coil relative to each other as the scanning mirror rotates. One of the permanent magnet and the wire coil locates on and rotates with the scanning mirror and the other locates off the scanning mirror. The method further includes measuring an induced voltage in the wire coil caused by the relative rotation. The method also includes determining, by at least one controller, a rotation angle of the scanning mirror based on the induced voltage in the wire coil.

Embodiments of the disclosure further provide a micromirror assembly. An exemplary micromirror assembly includes a scanning mirror configured to rotate around a tilting axis. The micromirror assembly further includes a permanent magnet configured to provide a magnetic field. The micromirror assembly also includes a wire coil configured to rotate relative to the permanent magnet when the scanning mirror rotates, causing an induced voltage in the wire coil. One of the permanent magnet and the wire coil locates on and rotates with the scanning mirror and the other locates off the scanning mirror.

It is to be understood that both the foregoing general description and the following detailed description are exemplary and explanatory only and are not restrictive of the invention, as claimed.

DETAILED DESCRIPTION

Figure 1:
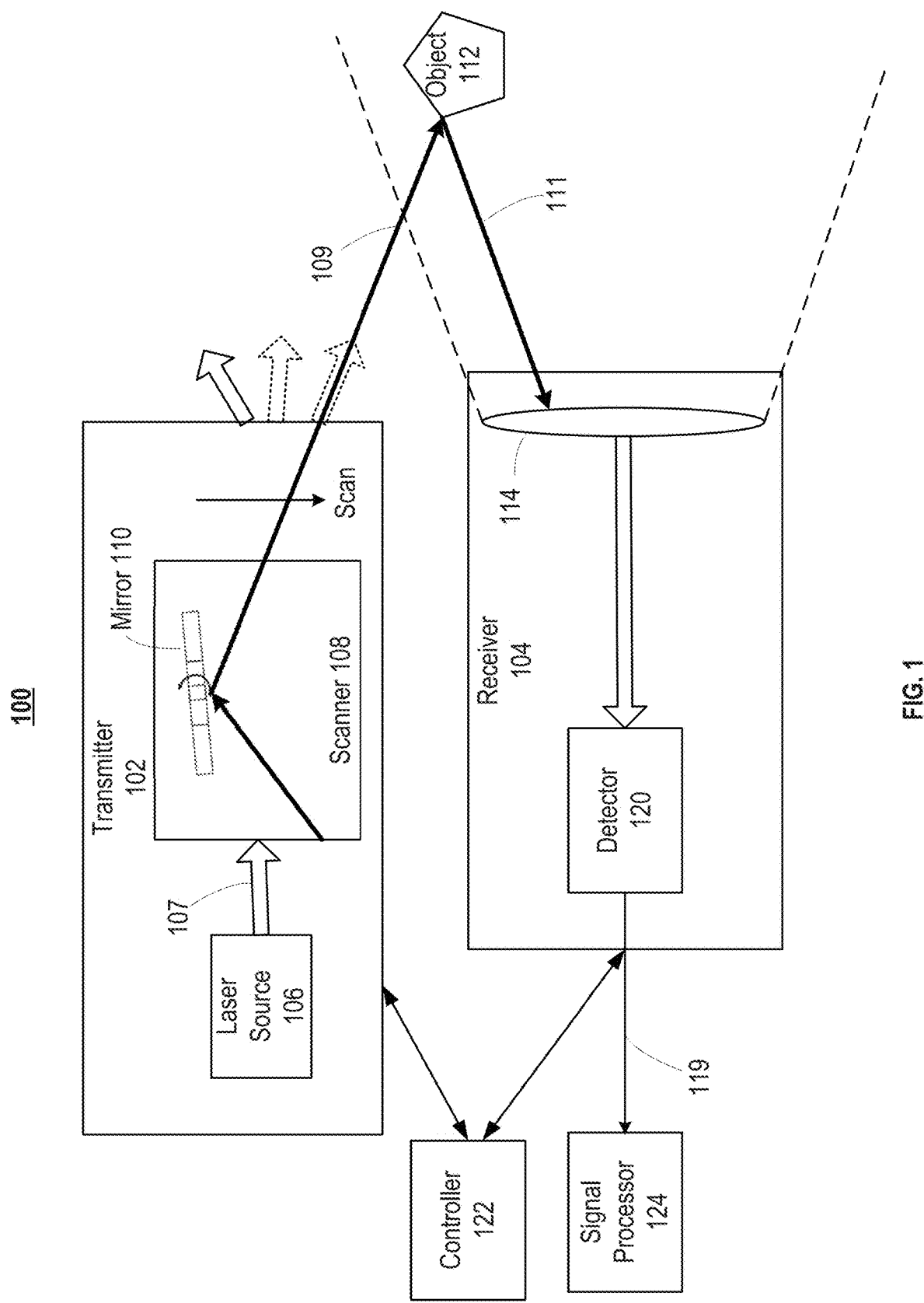
FIG. 1 illustrates a block diagram of an exemplary LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide magnetic sensing systems and methods for sensing an angular position of a scanning mirror (e.g., a MEMS mirror) used in LiDAR systems. In some embodiments, the magnetic sensing system includes at least one pair of permanent magnet and wire coil, and at least one controller. In some embodiments, one of the permanent magnet and wire coil is placed on the scanning mirror to move along with the mirror when it rotates. In some embodiments, the permanent magnet locates on the scanning mirror and the wire coil locates off the scanning mirror. In some alternative embodiments, the wire coil locates on the scanning mirror and the permanent magnet locates off the scanning mirror. When the MEMS mirror rotates, the permanent magnet and the wire coil move relatively to each other, causing an induced voltage in the wire coil. In some embodiments, the induced voltage may quickly change over a large range of values because the scanning mirror can rotate at a high resonance frequency (e.g., 5 kHz).

To implement a closed-loop feedback control to control the movement of the MEMS mirror, the rotation angle of the MEMS mirror has to be accurately measured. In some embodiments, the controller may determine a real-time angular position (e.g., rotation angle) of the MEMS mirror based on the induced voltage in the wire coil. For example, the controller may receive an electrical signal including a value and a variation trend or rate of the value of the induced voltage at a time point. The controller may further determine a rotation angle of the MEMS mirror based on a combination of the value and the variation trend or rate of the induced voltage at the time point using a predetermined look-up table that maps the respective values and the variation trends or rates of the value of the induced voltage to rotation angles of the MEMS mirror. In some embodiments, the controller may adaptively control one or more actuators to drive the MEMS mirror to oscillate based on this rotation angle sensed in real-time. For example, the controller may compare the determined angular position of the MEMS mirror with a target rotation angle. The controller may further supply a control signal to the actuator to speed up or slow down the rotation of the MEMS mirror based on the comparison.

The features and advantages described herein are not all-inclusive and many additional features and advantages will be apparent to one of ordinary skill in the art in view of the figures and the following descriptions.

The LiDAR system containing the disclosed magnetic sensing systems and methods for the scanning mirror can be used in many applications. For example, the LiDAR system can be used in advanced navigation technologies, such as to aid autonomous driving or to generate high-definition maps, in which the LiDAR system can be equipped on a vehicle to capture data including the depth information of the surrounding objects (such as moving vehicles, buildings, road signs, pedestrians, and the like).

FIG. 1 illustrates a block diagram of an exemplary LiDAR system 100, according to embodiments of the disclosure. LiDAR system 100 may include a transmitter 102, a receiver 104, a controller 122, and a signal processor 124. Transmitter 102 may emit laser beams along multiple directions. Transmitter 102 may include one or more laser sources 106 and a scanner 108.

Transmitter 102 can sequentially emit a stream of pulsed laser beams in different directions within a scan range (e.g., a range in angular degrees), as illustrated in FIG. 1. Laser source 106 may be configured to provide a laser beam 107 (also referred to as "native laser beam") to scanner 108. In some embodiments of the present disclosure, laser source 106 may generate a pulsed laser beam in the ultraviolet, visible, or near infrared wavelength range.

In some embodiments of the present disclosure, laser source 106 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 107 provided by a PLD may be larger than 700 nm, such as 760 nm, 785 nm, 808 nm, 848 nm, 905 nm, 940 nm, 980 nm, 1064 nm, 1083 nm, 1310 nm, 1480 nm, 1512 nm, 1550 nm, 1625 nm, 1654 nm, 1877 nm, 1940 nm, 2000 nm, etc. It is understood that any suitable laser source may be used as laser source 106 for emitting laser beam 107.

Scanner 108 may be configured to emit a laser beam 109 to an object 112 in a direction within a range of scanning angles. In some embodiments consistent with the present disclosure, scanner 108 may include a micromachined mirror assembly having a rotational mirror, such as a MEMS mirror 110. MEMS mirror 110, at its rotated angle, may deflect the laser beam 107 generated by laser sources 106 to the desired direction, which becomes laser beam 109. As will be described below in greater detail, the micromachined mirror assembly may further include a magnetic sensing system (not shown). The magnetic sensing system may be configured to determine an actual angular position of MEMS mirror 110 at any given time point, which can be used to provide feedback control to the scanning process. In some embodiments of the present disclosure, scanner 108 may also include other optical components (e.g., lenses, mirrors) that can focus pulsed laser light into a narrow laser beam to increase the scan resolution and the range to scan object 112.

Object 112 may be made of a wide range of materials including, for example, non-metallic objects, rocks, rain, chemical compounds, aerosols, clouds and even single molecules. The wavelength of laser beam 109 may vary based on the composition of object 112. In some embodiments, at each time point during the scan, scanner 108 may emit laser beam 109 to object 112 in a direction within a range of scanning angles by rotating the micromachined mirror assembly. Upon contact, laser beam 109 may be reflected by object 112 via backscattering, such as Raman scattering, and fluorescence to form a laser beam 111.

In some embodiments, receiver 104 may be configured to detect laser beam 111 returned from object 112. The returned laser beam 111 may be in a different direction from beam 109. Receiver 104 can collect laser beams returned from object 112 and output electrical signals reflecting the intensity of the returned laser beams. As illustrated in FIG. 1, receiver 104 may include a lens 114 and a detector 120. At each time point during the scan, lens 114 may be configured to collect light from a respective direction in its field of view (FOV) and converge the laser beam to focus before it is received on detector 120.

Detector 120 may be configured to detect laser beams passing through lens 114 and convert the detected laser beams into electrical signals. In some embodiments, detector 120 may convert the laser light (e.g., returned laser beam 111) collected by lens 114 into an electrical signal 119 (e.g., a current or a voltage signal). Electrical signal 119 may be generated when photons are absorbed in a photodiode included in detector 120. In some embodiments of the present disclosure, detector 120 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 100 may also include one or more signal processor 124. Signal processor 124 may receive electrical signal 119 generated by detector 120. Signal processor 124 may process electrical signal 119 to determine, for example, distance information carried by electrical signal 119. Signal processor 124 may construct a point cloud based on the processed information. Signal processor 124 may include a microprocessor, a microcontroller, a central processing unit (CPU), a graphical processing unit (GPU), a digital signal processor (DSP), or other suitable data processing devices. In some embodiments, signal processor 124 may be part of controller 122.

LiDAR system 100 may further include one or more controllers, such as a controller 122. Controller 122 may control the operation of transmitter 102 and/or receiver 104 to perform detection/sensing operations. Controller 122 may include components (not shown) such as a communication interface, a processor, a memory, and a storage for performing various control functions. In some embodiments, controller 122 may have different modules in a single device, such as an integrated circuit (IC) chip (implemented as, for example, an application-specific integrated circuit (ASIC) or a field-programmable gate array (FPGA)), or separate devices with dedicated functions. In some embodiments, the processor may include any appropriate type of general-purpose or special-purpose microprocessor, digital signal processor, or microcontroller. The memory or storage may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. For example, the memory and/or the storage may be configured to store program(s) that may be executed by the processor to control the operation of scanner 108.

In some embodiments, controller 122 may control a magnetic sensing system to sense an induced voltage caused by relative movement of a permanent magnet and a wire coil and determine the actual rotation angle of MEMS mirror 110 in real-time based on the induced voltage. In some embodiments, controller 122 may send control signals to scanner 108 to control the rotation of MEMS mirror 110 based on the sensed rotation angle. For example, controller 122 may implement a feedback control loop to control MEMS mirror 110 based on the real-time sensing.

Figure 2A:
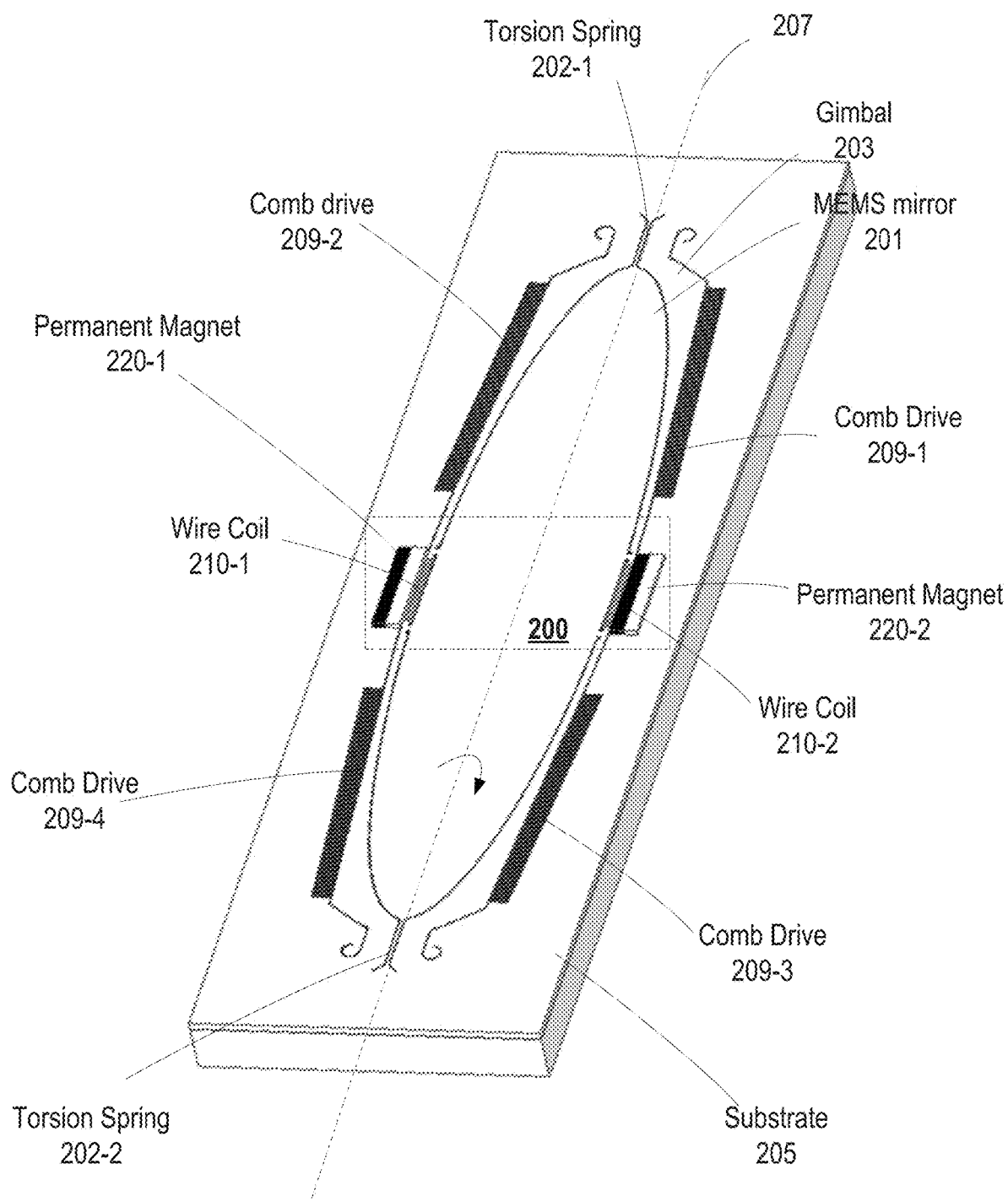
FIG. 2A illustrates a schematic diagram of an exemplary magnetic sensing system, according to embodiments of the disclosure.
Figure 2B:
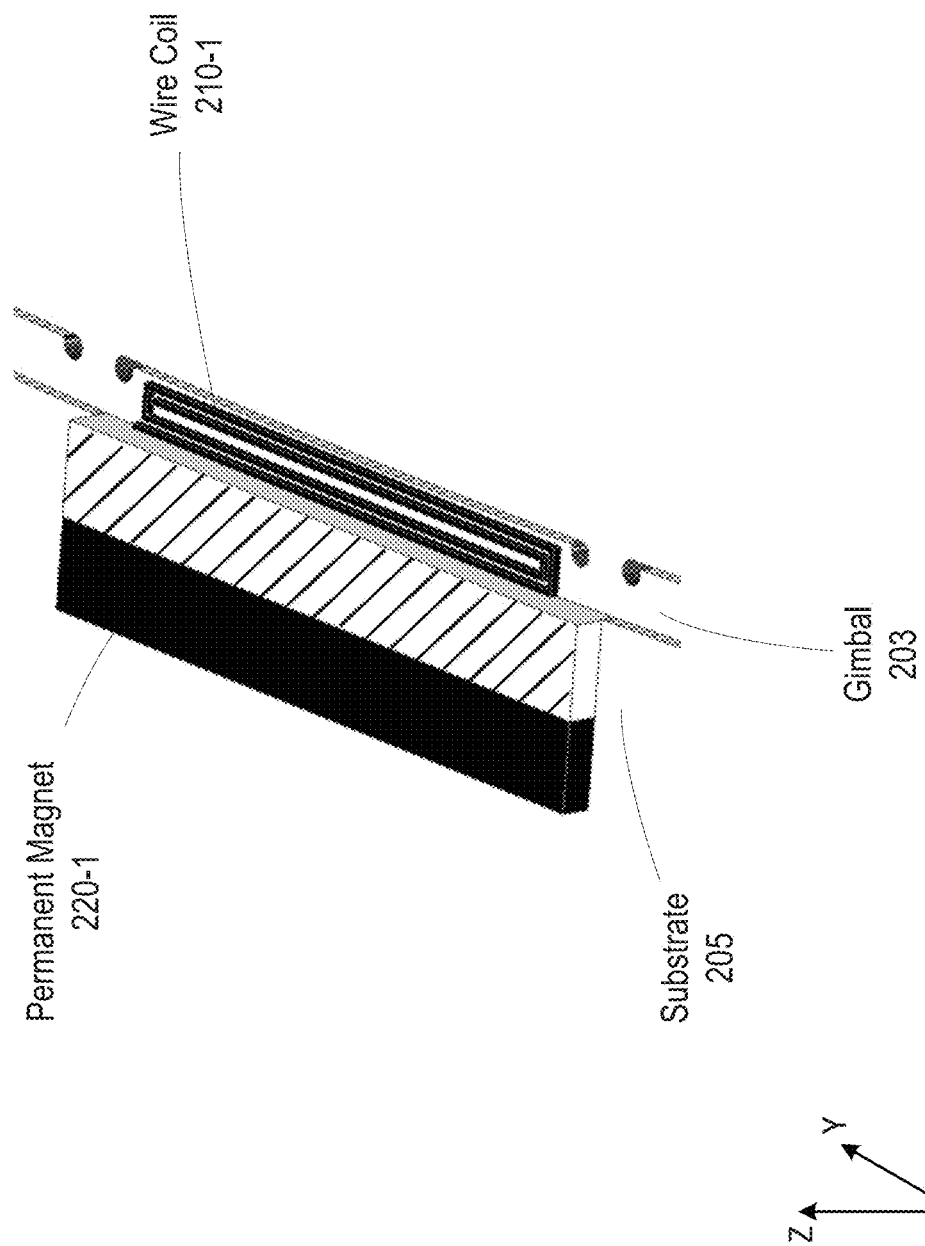
FIG. 2B illustrates a schematic diagram of a permanent magnet and a wire coil of the exemplary magnetic sensing system illustrated in FIG. 2A, according to embodiments of the disclosure.

FIG. 2A illustrates a schematic diagram of an exemplary magnetic sensing system, according to embodiments of the disclosure. FIG. 2B illustrates a schematic diagram of a permanent magnet and a wire coil of the exemplary magnetic sensing system illustrated in FIG. 2A, according to embodiments of the disclosure. In the following passages, FIGS. 2A-2B are described together. It is contemplated that while the disclosed magnetic sensing systems and methods are described in the context of exemplary MEMS mirrors for LiDAR system, its application is not limited to such examples, but can be extended to all rotational mirrors where a real-time sensing of the rotation angle is of benefit.

In some embodiments, the disclosed magnetic sensing system may include one or more pairs of wire coil and permanent magnet. For example, as shown in FIG. 2A, magnetic sensing system 200 include two pairs of wire coil and permanent magnet (e.g., wire coils 210-1 and 210-2, and permanent magnets 220-1 and 220-2). Wire coils 210-1 and 210-2 are mounted on a gimbal 203 that is mounted on and rotates with a MEMS mirror 201. MEMS mirror 201 may be implemented by a single mirror or an array of micro mirrors. As shown in FIG. 2A, a first torsion spring 202-1 is mechanically coupled to one side of MEMS mirror 201, and a second torsion spring 202-2 is mechanically coupled to the opposite side of MEMS mirror 201.

Consistent with some embodiments, MEMS mirror 201 may rotate continuously over a range of angles to reflect incident laser beams (e.g., laser beam 107) to the environment. For example, MEMS mirror 201 may be configured to tilt around a tilting axis (also referred to as axis 207 illustrated in a dashed line). Axis 207 may be defined by torsion springs 202-1 and 202-2, as MEMS mirror 201 may tilt due to the rotation of torsion springs 202-1 and 202-2. By tilting MEMS mirror 201 to a different angle, an incident laser beam (e.g., laser beam 107) may be reflected to a different direction, forming another reflected laser beam (e.g., laser beam 109). It is to be understood that although MEMS mirror 201 is illustrated as in an eclipse shape as shown in FIG. 2A, the shape of MEMS mirror 201 is not limited to an eclipse shape, and may vary in other examples, such as a square, round, or rectangular shape.

In some embodiments, MEMS mirror 201 may be a gimbaled mirror as shown in FIG. 2A. MEMS mirror 201 is mounted on a gimbal 203 that may be driven to rotate around axis 207 by one or more actuators (not shown) through comb drives 209-1, 209-2, 209-3, and 209-4. In some embodiments, each comb drive may include a plurality of movable comb fingers mounted on gimbal 203 and a plurality of static comb fingers mounted on a substrate 205. Substrate 205 is electrically isolated from the comb fingers. When the actuator applies a bias voltage on comb drives 209-1, 209-2, 209-3, and 209-4, the movable comb fingers may move relative to the static comb fingers and thereby drive gimbal 203 and MEMS mirror 201 to rotate around axis 207. In some alternative embodiments, MEMS mirror 201 may be a gimbal-less mirror. For the gimbal-less mirror, the movable comb fingers of the comb drives may be directly mounted on the edge of the gimbal-less mirror to drive the gimbal-less mirror to rotate around its axis when the actuator applies a bias voltage on the comb drives.

Consistent with some embodiments, one or more wire coils may be mounted on gimbal 203 and rotate along with gimbal 203. For example, wire coils 210-1 and 210-2 are mounted on gimbal 203 as shown in FIG. 2A. In case of the gimbal-less mirror, the wire coils may be mounted on the gimbal-less mirror, e.g., on the edge of the gimbal-less mirror. As shown in FIG. 2A, permanent magnets 220-1 and 220-2 locate on substrate 205 and placed symmetrically with respect to axis 207. When wire coil 210-1 rotates along with gimbal 203 around axis 207, wire coil 210-1 may cut across lines of force in a magnetic field provided by permanent magnet 220-1. A first voltage may thereby be induced in wire coil 210-1. Similarly, wire coil 210-2 may rotate along with gimbal 203 in a magnetic field provided by permanent magnet 220-2 in an opposite direction comparing with wire coil 210-1. When wire coil 210-2 rotates and cuts the magnetic field lines, a second voltage may be induced in wire coil 210-2. In some embodiments, the first induced voltage and the second induced voltage may form a differential output. For example, the first induced voltage and the second induced voltage are equal in value but opposite in polarity at any given time point. The differential output may have a higher signal-to-noise ratio (SNR) than that of either the first induced voltage or the second induced voltage, because the noises in the induced voltages cancel each other out when a difference is taken between the two induced voltages. In some embodiments, controller 122 may determine the rotation angle of MEMS mirror 201 based on the differential output. In some embodiments, each wire coil is placed closely to its paired permanent magnet for effectively cutting the magnetic field lines and avoiding interference from other magnetic fields. For example, as shown in FIG. 2B, when MEMS mirror 201 is in its initial state (i.e., non-tilt state), wire coil 210-1 has a shortest distance to permanent magnet 220-1.

In some alternative embodiments, the permanent magnet may be mounted on the gimbal and rotate along with the gimbal as well as the MEMS mirror, and the wire coil is placed on the substrate. In case of the gimbal-less mirror, the permanent magnet may be directly mounted on the gimbal-less mirror, e.g., on the edge of the gimbal-less mirror. When the permanent magnet rotates, the wire coil mounted on the substrate may cut across lines of force in a magnetic field provided by the moving permanent magnet. As a result, a voltage is thereby induced in the wire coil.

It is contemplated that though the exemplary magnetic system in FIG. 2A includes two wire coils (e.g., wire coils 210-1 and 210-2) and two permanent magnets (e.g., permanent magnets 220-1 and 220-2), the disclosed magnetic sensing system does not necessarily have a plurality pair of wire coil and permanent magnet. For example, magnetic sensing system 200 may only include one pair of wire coil and permanent magnet, e.g., wire coil 210-1 and permanent magnet 220-1 in FIG. 2B. In such a case, controller 122 may determine the rotation angle of MEMS mirror 201 based solely on the voltage induced in wire coil 210-1. The disclosed magnetic sensing system may also include more than two pairs of wire coil and permanent magnet, located at different places of the scanning mirror.

In some embodiments, the wire coil may be formed using a micro-fabrication technique (e.g., electroplating). For example, the wire coils (e.g., wire coils 210-1 and 210-2), the MEMS mirror (e.g., MEMS mirror 201), the comb drives (e.g., comb drives 209-1, 209-2, 209-3, and 209-4), the torsion springs (e.g., torsion springs 202-1 and 202-2), and the gimbal (e.g., gimbal 203) may be fabricated integrally using an electroplating and silicon etching process. In some embodiments, the wire coil may be a single-turn micro wire coil or a multi-turn micro wire coil. If the wire coil is a multi-turn micro wire coil, an insulation layer may be formed between each two adjacent turns of the wire coil.

In some embodiments, the permanent magnet may be a permanent neodymium (NdFeB) magnet. The permanent NdFeB magnet may be assembled on the scanning mirror with epoxy or other adhesives if the wire coil is formed on the substrate. If the wire coil is formed on the gimbal or on the gimbal-less scanning mirror, the permanent NdFeB magnet may be assembled off the scanning mirror (e.g., on the substrate) with epoxy or other adhesives.

In some embodiments, the permanent magnet may be formed using the electroplating technique. For example, a magnetic metal (e.g., Fe, Co, Ni, or the like) or magnetic alloy (e.g., Alnico) may be electroplated on the substrate or on the gimbal using the electroplating technique. The magnetic metal or the magnetic alloy may further be magnetized to form the permanent magnet in the disclosed magnetic sensing systems.

In some embodiments, trenches may be etched on a silicon wafer using the micro-fabrication technique. In some embodiments, a mixture of magnetic powder and wax powder may be filled in the etched trenches. For example, the magnetic powder may be magnetic metal powder (e.g., Fe, Co, Ni, or the like), magnetic alloy powder (e.g., Alnico), or a mixture of the magnetic metal powder and the magnetic alloy powder. In some embodiments, the mixture may be heated to melt the wax powder in the mixture to glue the magnetic powder together in the etched trenches. The mixture may further be magnetized to form the permanent magnet in the disclosed magnetic sensing systems.

In some alternative embodiments, only magnetic powder may be filled in the etched trenches. For example, the magnetic powder may be magnetic metal powder (e.g., Fe, Co, Ni, or the like), magnetic alloy powder (e.g., Alnico), or a mixture of the magnetic metal powder and the magnetic alloy powder. In some embodiments, an interlink material may be deposited on the magnetic metal powder to seal the magnetic metal powder into the etched trenches. For example, the interlink material, e.g., aluminum monoxide (AlO), may be deposited using an atomic layer deposition (ALD) method. As another example, the interlink material (e.g., parylene) may be deposited using a chemical vapor deposition (CVD) method. In some embodiments, the magnetic powder may further be magnetized to form the permanent magnet in the disclosed magnetic sensing systems.

Figure 3:
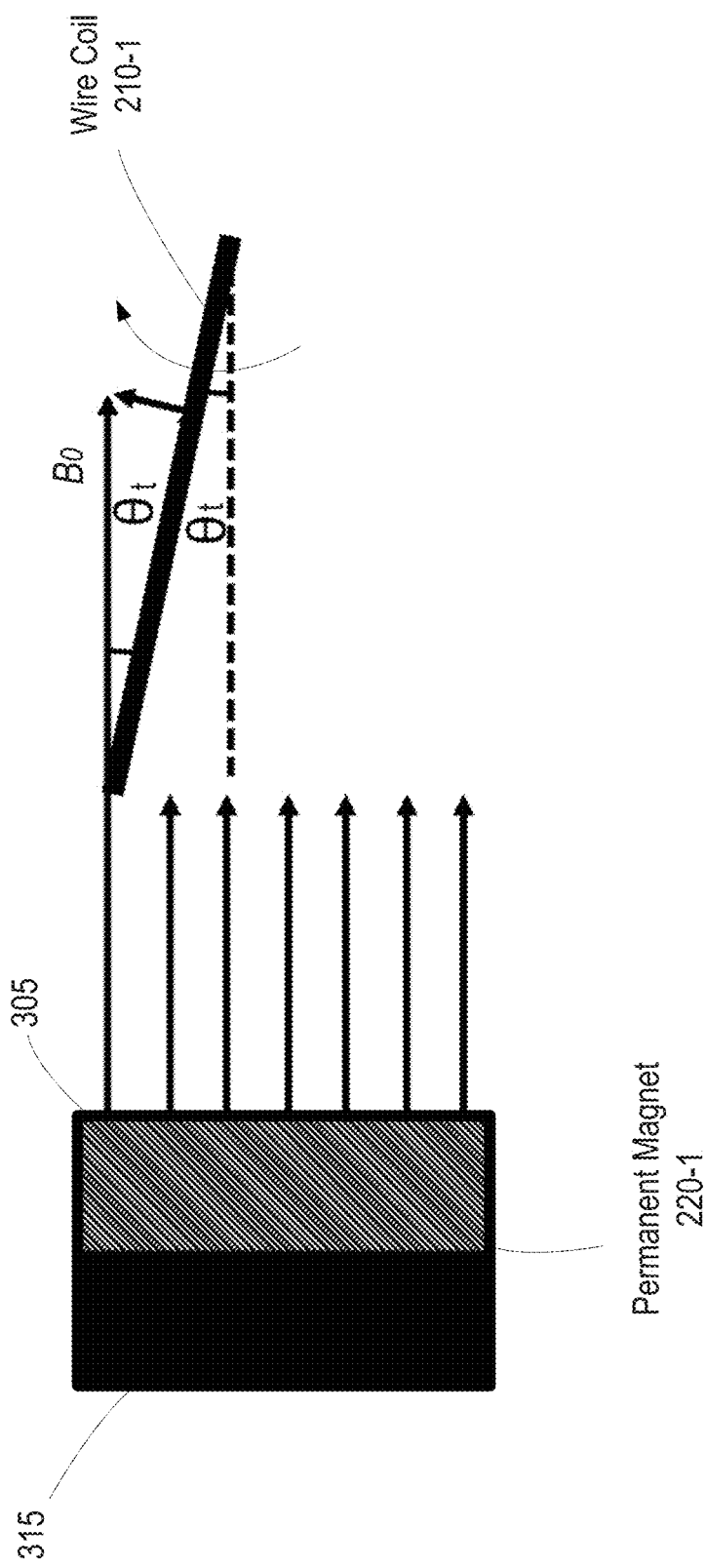
FIG. 3 illustrates a cross section view of the permanent magnet and the wire coil in FIG. 2B when the MEMS mirror is not in its initial state, according to embodiments of the disclosure.

FIG. 3 illustrates a cross section view of the permanent magnet and the wire coil in FIG. 2B when the MEMS mirror is not in an initial state, according to embodiments of the disclosure. As shown in FIG. 3, permanent magnet 220-1 includes a north magnetic pole 305 (illustrated in a rectangle filled with diagonal lines) and a south magnetic pole 315 (illustrated in a solid rectangle). A magnet field close to north magnetic pole 305 has a substantially uniform distribution in a horizontal direction (illustrated in arrow lines pointing in X-axis direction in FIG. 3). Because wire coil 210-1 locates close to permanent magnet 220-1, wire coil 210-1 rotates in a magnetic field with a substantially uniform magnetic flux density. Consistent with the present disclosure, wire coil 210-1 rotates clockwise along with gimbal 203 (not shown in FIG. 3) and moves relative to permanent magnet 220-1.

In some embodiments, the magnetic flux crossing the wire coil at a time point t may be calculated as a function of the rotation angle of the MEMS mirror. For example, magnetic flux $\Phi_t$ for coil with single turn may be determined according to Equation (1):

$$\Phi_t = A \cdot B_0 \cdot \sin(\theta_t) \qquad (1)$$

where A is an area of the wire coil, $B_0$ is the magnetic flux density of the magnetic field, and $\theta_t$ is the rotation angle of the MEMS mirror at time point t. Consistent with some embodiments, the wire coil (e.g., wire coil 210-1) is in a rectangular shape as shown in FIG. 2B. Area A in Equation (1) can be calculated as a product of a width of the wire coil and a length of the wire coil. It is to be understood that although wire coil 210-1 is in a rectangular shape as shown in FIG. 2B, the shape of wire coil 210-1 is not limited to a rectangular shape, and may vary in other examples, such as a square, round, or eclipse shape, other than a rectangle. The area A can be calculated according to the shape of the wire coil.

In some embodiments, rotation angle $\theta_t$ at time point t may be calculated as a function of time point t. For example, rotation angle $\theta_t$ may be determined according to Equation (2):

$$\theta_t = \theta_{max} \cdot \sin((\omega t)) \quad (2)$$

where $\theta_{max}$ is the maximum rotation angle of the MEMS mirror, and $\omega$ is the angular frequency of the MEMS mirror at time point t. Given Equations (1) and (2), magnetic flux $\Phi_t$ cross the wire coil may be calculated as a function of time point t according to Equation (3):

$$\Phi_t = A \cdot B_0 \cdot \sin[\theta_{max} \cdot \sin(\omega t)] \quad (3)$$

According to Faraday's Law, any change in the magnetic environment of a wire coil may cause a voltage (i.e., electromotive force) to be "induced" in the wire coil. The induced voltage in the wire coil is equal to the negative changing rate of magnetic flux times the number of turns in the wire coil according to Equation (4):

$$\varepsilon_t = -N \cdot \frac{\Delta \Phi_t}{\Delta t} \quad (4)$$

where N is the number of turns in the wire coil, and $$\frac{\Delta \Phi_t}{\Delta t}$$

is the change rate of the magnetic flux at time point t for single coil turn. In some embodiments, based on Equations (3) and (4), induced voltage $\varepsilon_t$ at time point t may be calculated as a function of time point t according to Equation (5):

$$\varepsilon_t = -N \cdot A \cdot B_0 \cdot \cos[\theta_{max} \cdot \sin(\omega t)] \cdot \theta_{max} \cdot \omega \cdot \cos(\omega t) \quad (5)$$

Figure 4:
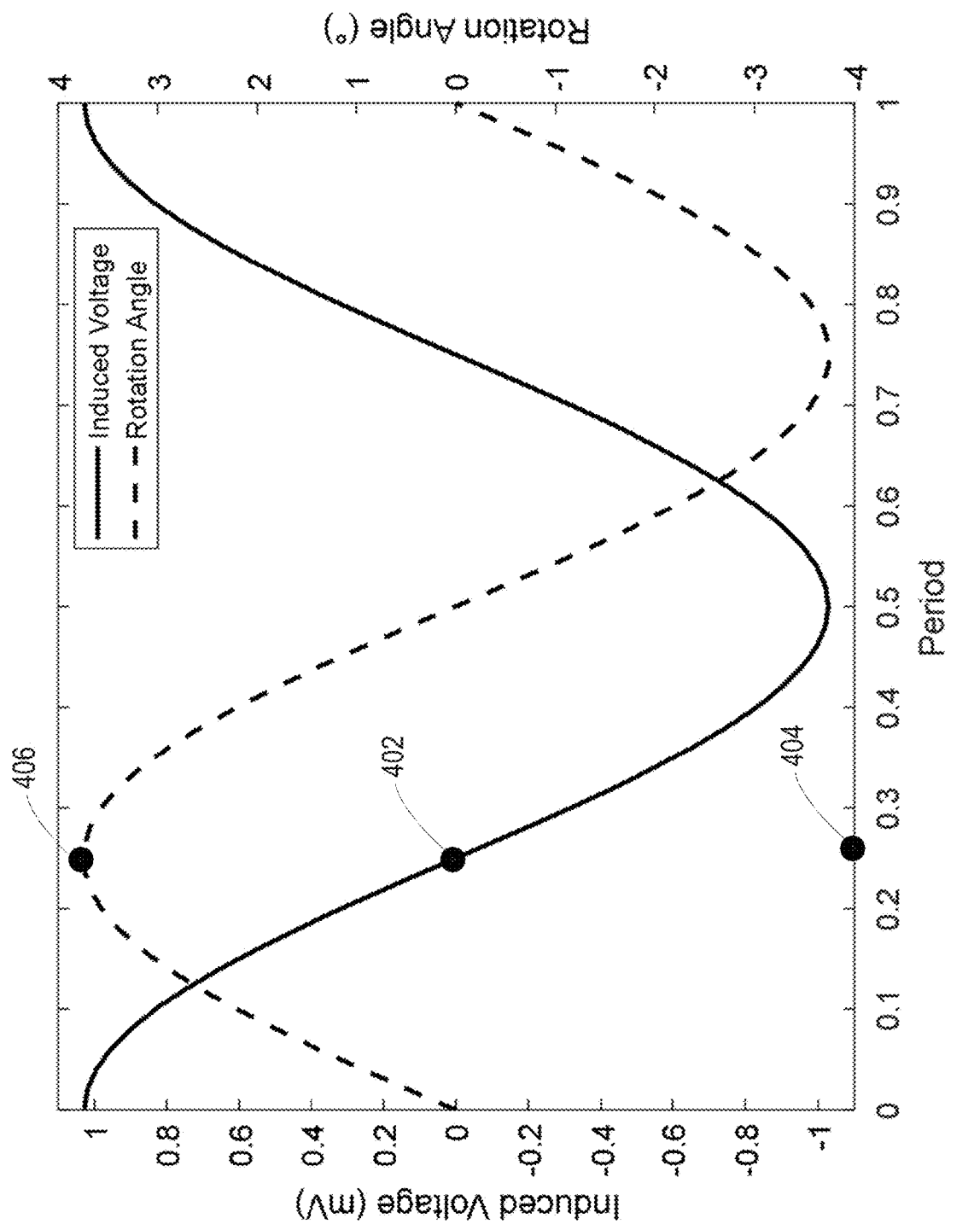
FIG. 4 illustrates a line diagram of an exemplary relationship between an induced voltage and a rotation angle of a MEMS mirror, according to embodiments of the disclosure.

In some embodiments, the rotation angles of the MEMS mirror corresponding to various induced voltages may be calculated offline, e.g., by a separate processor, according to Equations (2) and (5). FIG. 4 illustrates a line diagram of an exemplary relationship between an induced voltage and a rotation angle of a MEMS mirror, according to embodiments of the disclosure. As shown in FIG. 4, the rotation angle of the MEMS mirror at a given time point can be determined based on a combination of the value of the induced voltage and the variation trend or rate of the value of the induced voltage at the given time point. For example, if a value of the induced voltage is zero and the value of the induced voltage is decreasing (e.g., at point 402), the current time point t in a rotation period (e.g., expressed as a percentage of the rotation period)) can be determined (e.g., time point 404 is determined according to point 402). Based on the determined time point t (time point 404 in FIG. 4), a value of the rotation angle at the rotation period can be determined, e.g., point 406 on the induced voltage waveform. In some embodiments, the mapping between rotation angles and combinations of the values of the induced voltage and the variation trends or rates of the value of the induced voltage may be calculated offline according to Equations (2) and (5) and recorded in a look-up table. In some embodiments, the look-up table may be preprogramed in controller 122. Consistent with some embodiments, controller 122 may further provide a closed-loop feedback control to the MEMS mirror based on the determined rotation angle of the MEMS mirror using the look-up table.

Figure 5:
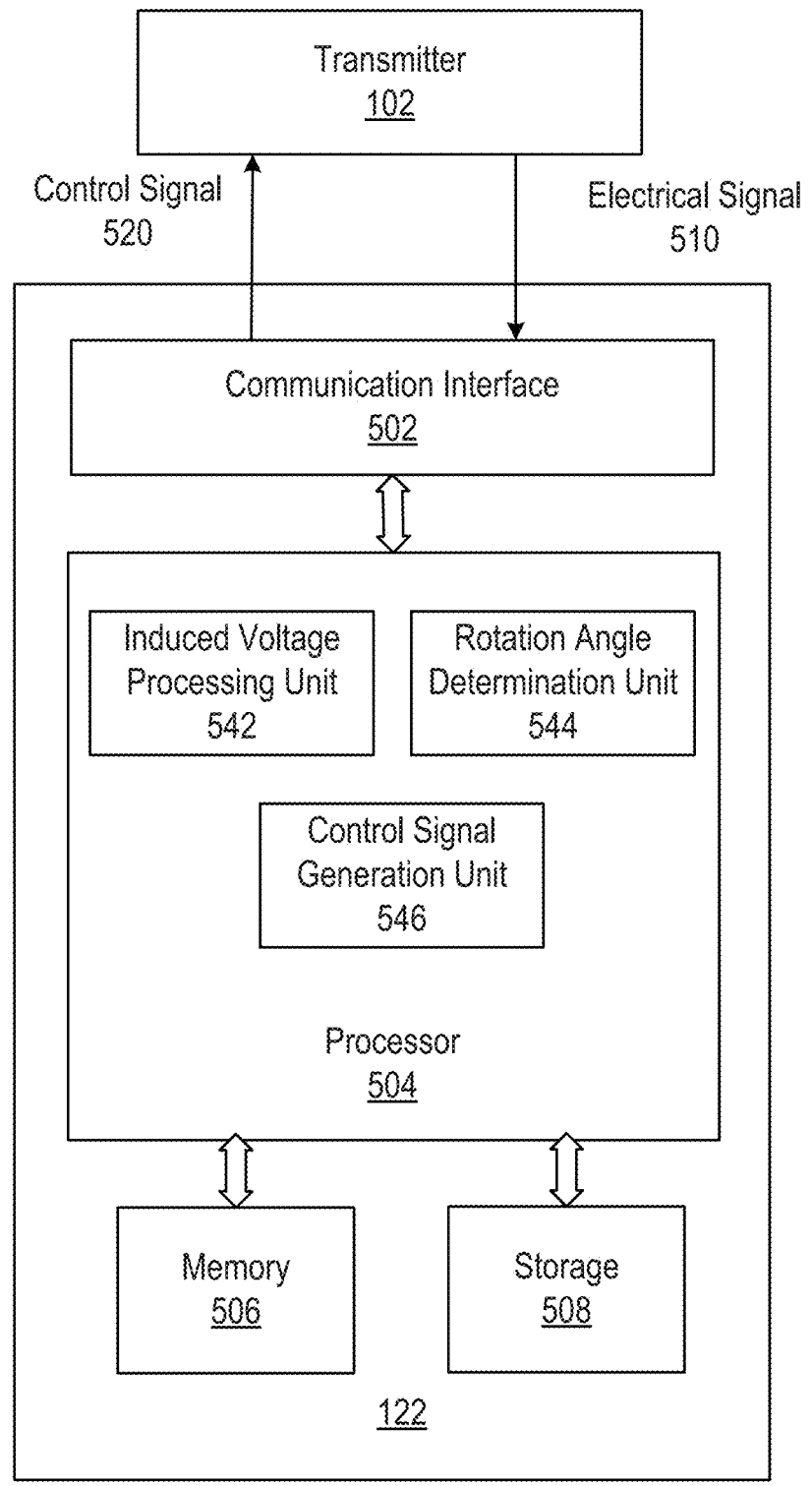
FIG. 5 illustrates a schematic diagram of an exemplary controller for determining a rotation angle of a MEMS mirror, according to embodiments of the disclosure.

For example, FIG. 5 illustrates a block diagram of an exemplary controller 122 for determining a rotation angle of a MEMS mirror (e.g., MEMS mirror 110), according to embodiments of the disclosure. Consistent with the present disclosure, controller 122 may be configured to receive and process the induced voltage from magnetic sensing system 200 in transmitter 102. Controller 122 may further be configured to determine an angular position (e.g., rotation angle) of MEMS mirror 110 based on the processed induced voltage at a given time point. Controller 122 may also be configured to generate a control signal based on the determined rotation angle for feedback controlling MEMS mirror 110 via actuators.

In some embodiments, as shown in FIG. 5, controller 122 may include a communication interface 502, a processor 504, a memory 506, and a storage 508. In some embodiments, controller 122 may have different modules in a single device, such as an integrated circuit (IC) chip (implemented as an application-specific integrated circuit (ASIC) or a field-programmable gate array (FPGA), or separate devices with dedicated functions. Components of controller 122 may be in an integrated device, or distributed at different locations but communicate with each other through a network (not shown). For example, processor 504 may be a processor on-board LiDAR system 100, a processor inside a stand-alone computing, or a cloud processor, or any combinations thereof.

Communication interface 502 may send data to and receive data from components such as transmitter 102/receiver 104 via communication cables, a Wireless Local Area Network (WLAN), a Wide Area Network (WAN), wireless networks such as radio waves, a nationwide cellular network, and/or a local wireless network (e.g., Bluetooth™ or WiFi), or other communication methods. In some embodiments, communication interface 502 can be an integrated services digital network (ISDN) card, cable modem, satellite modem, or a modem to provide a data communication connection. As another example, communication interface 502 can be a local area network (LAN) card to provide a data communication connection to a compatible LAN. Wireless links can also be implemented by communication interface 502. In such an implementation, communication interface 502 can send and receive electrical, electromagnetic or optical signals that carry digital data streams representing various types of information via a network.

Processor 504 may include any appropriate type of general-purpose or special-purpose microprocessor, digital signal processor, or microcontroller. Processor 504 may be configured as a separate processor module dedicated to detecting a rotation angle of the scanning mirror (e.g., MEMS mirror 110) at any given time point and adaptively controlling the rotation of the scanning mirror based on the detected rotation angle. Alternatively, processor 504 may be configured as a shared processor module for performing other functions such as controlling transmitter 102/receiver 104.

As shown in FIG. 5, processor 504 may include multiple modules, such as an induced voltage processing unit 542, a rotation angle determination unit 544, a control signal generation unit 546, and the like. These modules (and any corresponding sub-modules or sub-units) can be hardware units (e.g., portions of an integrated circuit) of processor 504 designed for use with other components or to execute a part of a program. The program may be stored on a computer-readable medium, and when executed by processor 504, it may perform one or more functions. Although FIG. 5 shows units 542-546 all within one processor 504, it is contemplated that these units may be distributed among multiple processors located near or remotely with each other.

In some embodiments, induced voltage processing unit 542 may be configured to receive an electrical signal 510 (e.g., induced voltage) from the magnetic sensing system (e.g., magnetic sensing system 200). In some embodiments, electrical signal 510 may be a differential output including two induced voltages that are equal in value but opposite in polarity. Consistent with the present disclosure, the two voltages are induced in the two wire coils placed symmetrically with respect to the tilting axis (e.g., axis 207) of the MEMS mirror. In some embodiments, the turn orientation of the two wire coils may be specifically designed to meet a requirement of the differential output at any given time point. In some embodiments, controller 122 may further be configured to reduce a common mode noise to increase SNR for the processed output based on the differential output. In some embodiments, if the magnetic sensing system only includes one pair of permanent magnet and wire coil, induced voltage processing unit 542 may be skipped and electrical signal 510 may be processed by rotation angle determination unit 544 directly.

In some embodiments, rotation angle determination unit 544 may be configured to determine the rotation angle of the MEMS mirror (e.g., MEMS mirror 110) based on the processed induced voltage generated from induced voltage processing unit 542. Consistent with some embodiments, if electrical signal 510 is not a differential output, rotation angle determination unit 544 may be configured to receive electrical signal 510 and determine the rotation angle of the MEMS mirror based on electrical signal 510. In some embodiments, rotation angle determination unit 544 may be configured to calculate the rotation angle of the MEMS mirror in real-time according to Equations (2) and (5).

In some alternative embodiments, a look-up table may be used to map each combination of the value of the induced voltage and the variation trend or rate of the value of the induced voltage to one of rotation angles of the MEMS mirror. In one example, the look-up table may be pre-computed and stored in memory 506/storage 508 of controller 122 and retrieved by rotation angle determination unit 544. In another example, the look-up table may be stored and updated in a remote location and retrieved by controller 122 via communication interface 502 as needed. It is contemplated that rotation angle determination unit 544 of controller 122 may use any other suitable approach to determine the rotation angle based on electrical signal 510 at any given time point.

In some embodiments, control signal generation unit 546 may be configured to provide a closed-loop feedback control to MEMS mirror 110, e.g., by sending control signals (e.g., control signal 520) to the anchor of MEMS mirror 110. For example, controller 122 may compare the sensed rotation angle with a target rotation angle of MEMS mirror 110 at a corresponding time point. Consistent with some embodiments, the actual rotation angle is determined by rotation angle determination unit 544 based on the induced voltage (e.g., electrical signal 510) at the sensing time point. The target rotation angle is an intended rotation angle of MEMS mirror 110 at the same time point. If the determined rotation angle is smaller than the intended angle, controller 122 may send a control signal to actuate MEMS mirror 110 to increase the speed of MEMS mirror 110. Otherwise, if the determined rotation angle is larger than the intended angle at the sensing time point, controller 122 may send a control signal to the actuator to slow down MEMS mirror 110. Using the closed-loop control based on a real-time sensing of the rotation angle, MEMS mirror 110 may be actuated to a target angle that is intended. LiDAR scanning and receiving accuracy can be improved accordingly. For example, the disclosed LiDAR systems may increase scan resolution around the center of each scan based on the real-time adaptive control of the rotation of MEMS mirror 110.

Memory 506 and storage 508 may include any appropriate type of mass storage provided to store any type of information that processor 504 may need to operate. Memory 506 and storage 508 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 506 and/or storage 508 may be configured to store one or more computer programs that may be executed by processor 504 to perform functions disclosed herein. For example, memory 506 and/or storage 508 may be configured to store program(s) that may be executed by processor 504 for adaptive control of the rotation of MEMS mirror 110 in real-time.

Memory 506 and/or storage 508 may be further configured to store information and data used by processor 504. For instance, memory 506 and/or storage 508 may be configured to store the look-up table that maps the values of the induced voltage and the variation trends or rates of the value of the induced voltage to the rotation angles of the MEMS mirror. In some embodiments, memory 506 and/or storage 508 may also store intermediate data such as processed electrical signals 510 (e.g., the values of the induced voltage and the variation trends or rates of the value of the induced voltage), determined rotation angles, comparison results of each pair of the determined rotation angle and the target rotation angle, etc. The various types of data may be stored permanently, removed periodically, or disregarded immediately after each scan.

Figure 6:
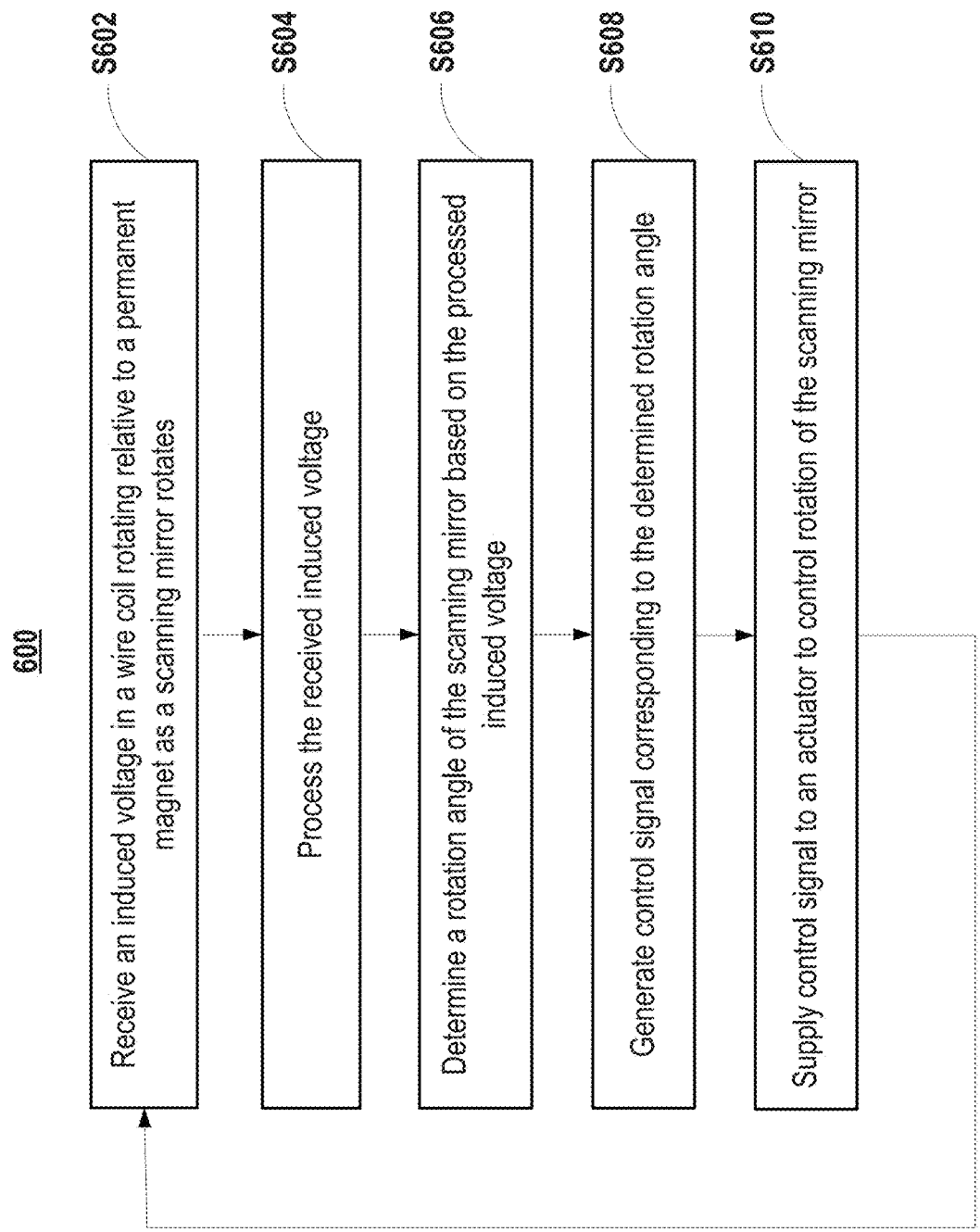
FIG. 6 illustrates a flow chart of an exemplary magnetic sensing method for a MEMS mirror, according to embodiments of the disclosure.

FIG. 6 illustrates a flow chart of an exemplary magnetic sensing method 600 for a MEMS mirror, according to embodiments of the disclosure. For example, method 600 may be implemented by magnetic sensing system 200 in FIG. 2A along with controller 122. However, method 600 is not limited to that exemplary embodiment. Method 600 may include steps S602-S610 as described below. It is to be appreciated that some of the steps may be optional to perform the disclosure provided herein. Further, some of the steps may be performed simultaneously, or in a different order than shown in FIG. 6.

In step S602, an induced voltage (e.g., electrical signal 510) is received by a processor (e.g., processor 504) of a controller (e.g., controller 122) from a magnetic sensing system (e.g., magnetic sensing system 200) at a current time point. The voltage is induced in a wire coil that moves relative to a permanent magnet (e.g., permanent magnet 220-1) when a scanning mirror rotates (e.g., MEMS mirror 201). Consistent with some embodiments, one of the wire coil and the permanent magnet locates on the scanning mirror and the other locates off the scanning mirror (e.g., on substrate 205). In some embodiments, the induced voltage may be sensed and sent to the controller when the scanning mirror is rotated to a new angular position. For example, controller 122 may receive an induced voltage (e.g., electrical signal 510) indicative of a new rotation angle of MEMS mirror 201. In some alternative embodiments, controller 122 may receive electrical signals periodically without knowing that the rotation angle of MEMS mirror 201 has changed.

In step S604, the received induced voltage (e.g., electrical signal 510) may be processed by the processor (e.g., processor 504) of the controller (e.g., controller 122). Consistent with some embodiments, the disclosed magnetic sensing system may include more than one pair of wire coil and permanent magnet. For example, magnetic sensing system 200 in FIG. 2A includes two pairs of wire coils (e.g., wire coils 210-1 and 210-2) and permanent magnets (e.g., permanent magnets 220-1 and 220-2) that are placed symmetrically with respect to the tilting axis (e.g., axis 207) of the scanning mirror. Consistent with some embodiments, when the scanning mirror (e.g., MEMS mirror 201) rotates, voltages induced in the two wire coils may form a differential output because the two induced voltages are equal in value but opposite in polarity. In step S604, processor 504 may be configured to take a difference between the two induced voltages to determine the differential output. Using a differential output can reduce a common mode noise in the differential output and increase its SNR. In some alternative embodiments, step S604 may be skipped if the received induced voltage from the magnetic sensing system is not a differential output. For example, when the magnetic sensing system includes only one pair of wire coil and permanent magnet, electrical signal 510 is not a differential output and step S604 can be skipped.

In step S606, the processor of the controller may determine the rotation angle of the scanning mirror based on the processed induced voltage at current time point. For example, processor 504 of controller 122 can determine the rotation angle of MEMS mirror 201 based on the processed induced voltage using a look-up table or according to formulas. As one example, processor 504 may determine the rotation angle of MEMS mirror 201 using the look-up table to map the processed induced voltage (e.g., the value of the induced voltage and the variation trend or rate of the value of the induced voltage) to one of the rotation angles of MEMS mirror 201. As another example, processor 504 may determine the rotation angle of the scanning mirror (e.g., MEMS mirror 201) on-the-fly based on the processed induced voltage according to Equations (2) and (5).

In step S608, the processor of the controller can generate a control signal based on the determined rotation angle of the scanning mirror. For example, processor 504 of controller 122 may compare the determined rotation angle of the scanning mirror with a target angle at the current time point. If the determined rotation angle is smaller than the target angle at the current time point, processor 504 may generate a control signal to speed up the rotation of the scanning mirror. If the determined rotation angle is larger than the target angle at current time point, processor 504 may generate a control signal to slow down the rotation of the scanning mirror.

In step S610, the processor of the controller can supply the generated control signal to an actuator of the scanning mirror to control rotation of the scanning mirror. For example, processor 504 can change a torsion speed/rate of MEMS mirror 201 by sending the control signal to control the actuator of MEMS mirror 201. The actuator of MEMS mirror 201 may adjust the torsion speed of MEMS mirror 201 based on the received control signal from processor 504 of controller 122. After supplying the generated control signal to the actuator of the scanning mirror, the processor of the controller may determine the next rotation angle of the scanning mirror and provide feedback control the rotation of the scanning mirror for the next time point by repeating steps S602-S610.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A magnetic sensing system for a scanning mirror, comprising:
    a permanent magnet configured to provide a magnetic field;
    a wire coil configured to rotate relative to the permanent magnet when the scanning mirror rotates, causing an induced voltage in the wire coil, wherein one of the permanent magnet and the wire coil locates on and rotates with the scanning mirror and the other locates off the scanning mirror; and
    at least one controller configured to determine a rotation angle of the scanning mirror based on the induced voltage in the wire coil.

2. The magnetic sensing system of claim 1, wherein the permanent magnet is a permanent neodymium (NdFeB) magnet that is assembled on the scanning mirror or a substrate off the scanning mirror with epoxy.

3. The magnetic sensing system of claim 1, wherein the permanent magnet is formed by electroplating and magnetizing a magnetic metal or alloy.

4. The magnetic sensing system of claim 1, wherein the permanent magnet is formed by:
    etching trenches on a silicon wafer;
    filling the trenches with a mixture of magnetic powder and wax powder;
    melting the wax powder; and
    magnetizing the mixture.

5. The magnetic sensing system of claim 1, wherein the permanent magnet is formed by:
    etching trenches on a silicon wafer;
    filling the trenches with magnetic powder;
    sealing the trenches by depositing an interlink material; and
    magnetizing the magnetic powder.

6. The magnetic sensing system of claim 5, wherein the interlink material comprises parylene or aluminum monoxide (AlO).

7. The magnetic sensing system of claim 1, wherein to determine a rotation angle of the scanning mirror based on the induced voltage in the wire coil, the at least one controller is further configured to:
    determine a value of the induced voltage at a time point; and determine a variation trend or rate of the value of the induced voltage at the time point.

8. The magnetic sensing system of claim 7, wherein to determine a rotation angle of the scanning mirror based on the induced voltage in the wire coil, the at least one controller is further configured to:
 determine the rotation angle of the scanning mirror at the time point based on a combination of the value and variation trend or rate of the induced voltage at the time point using a predetermined look-up table that maps the respective values of the induced voltage and the variation trends or rates of the value of the induced voltage to rotation angles of the scanning mirror.

9. The magnetic sensing system of claim 1, further comprising another pair of permanent magnet and wire coil, wherein the two pairs of permanent magnet and wire coil are placed symmetrically with respect to a tilting axis of the scanning mirror.

10. The magnetic sensing system of claim 9, wherein the at least one controller is configured to measure a differential output formed by induced voltages in the two wire coils, wherein the induced voltages in the two wire coils are equal in value but opposite in polarity.

11. The magnetic sensing system of claim 10, wherein the scanning mirror is a MEMS mirror for steering light in a LiDAR system.

12. The magnetic sensing system of claim 1, wherein the at least one controller is further configured to adaptively control the rotation of the scanning mirror based on the determined rotation angle.

13. The magnetic sensing system of claim 12, wherein to adaptively control the rotation of the scanning mirror based on the determined rotation angle, the at least one controller is further configured to:
 compare the determined rotation angle with a target rotation angle; and
 supply a control signal to an actuator of the scanning mirror to speed up or slow down the rotation of the scanning mirror based on the comparison.

14. A magnetic sensing method for a scanning mirror, comprising:
 rotating a permanent magnet and a wire coil relative to each other as the scanning mirror rotates, wherein one of the permanent magnet and the wire coil locates on and rotates with the scanning mirror and the other locates off the scanning mirror;
 measuring an induced voltage in the wire coil caused by the relative rotation; and
 determining, by at least one controller, a rotation angle of the scanning mirror based on the induced voltage in the wire coil.

15. The magnetic sensing method of claim 14, wherein determining, by at least one controller, a rotation angle of the scanning mirror based on the induced voltage in the wire coil further comprises:
 determining a value of the induced voltage at a time point; and
 determining a variation trend or rate of the value of the induced voltage at the time point.

16. The magnetic sensing method of claim 15, wherein determining, by at least one controller, a rotation angle of the scanning mirror based on the induced voltage in the wire coil further comprises:
 determining the rotation angle of the scanning mirror at the time point based on a combination of the value and variation trend or rate of the induced voltage at the time point using a predetermined look-up table that maps the respective values of the induced voltage and the variation trends or rates of the value of the induced voltage to rotation angles of the scanning mirror.

17. The magnetic sensing method of claim 14, further comprising:
 rotating another pair of permanent pair of permanent magnet and wire coil, wherein the two pairs of permanent magnet and wire coil are placed symmetrically with respect to a tilting axis of the scanning mirror;
 measuring a differential output formed by induced voltages in the two wire coils, wherein the induced voltages in the two wire coils are equal in value but opposite in polarity; and
 determining the rotation angle of the scanning mirror based on the differential output.

18. The magnetic sensing method of claim 14, further comprising adaptively controlling the rotation of the scanning mirror, by the at least one controller, based on the determined rotation angle.

19. A micromirror assembly, comprising:
 a scanning mirror configured to rotate around a tilting axis;
 a permanent magnet configured to provide a magnetic field; and
 a wire coil configured to rotate relative to the permanent magnet when the scanning mirror rotates, causing an induced voltage in the wire coil, wherein one of the permanent magnet and the wire coil locates on and rotates with the scanning mirror and the other locates off the scanning mirror, wherein the wire coil is coupled to at least one controller configured to determine a rotation angle of the scanning mirror based on the induced voltage in the wire coil.

20. The micromirror assembly of claim 19, wherein to determine a rotation angle of the scanning mirror based on the induced voltage in the wire coil, the at least one controller is further configured to:
 determine a value of the induced voltage at a time point; and
 determine a variation trend or rate of the value of the induced voltage at the time point.

* * * * *